United States Patent
Zu et al.

(10) Patent No.: US 12,286,026 B2
(45) Date of Patent: Apr. 29, 2025

(54) PROCESSING METHOD AND APPARATUS FOR FEE CALCULATION, AND VEHICLE PAYMENT SYSTEM

(71) Applicant: CHINA UNIONPAY CO., LTD., Shanghai (CN)

(72) Inventors: Lijun Zu, Shanghai (CN); Sishuang Wan, Shanghai (CN); Yue Jin, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 226 days.

(21) Appl. No.: 16/957,280

(22) PCT Filed: Dec. 11, 2018

(86) PCT No.: PCT/CN2018/120279
§ 371 (c)(1),
(2) Date: Jun. 23, 2020

(87) PCT Pub. No.: WO2019/128696
PCT Pub. Date: Jul. 4, 2019

(65) Prior Publication Data
US 2020/0398692 A1    Dec. 24, 2020

(30) Foreign Application Priority Data
Dec. 29, 2017   (CN) .......................... 201711480886.4

(51) Int. Cl.
*B60L 53/66* (2019.01)
*B60L 53/16* (2019.01)
(Continued)

(52) U.S. Cl.
CPC ............. *B60L 53/665* (2019.02); *B60L 53/16* (2019.02); *G06Q 20/145* (2013.01); *G06Q 20/3278* (2013.01); *G06Q 20/3674* (2013.01)

(58) Field of Classification Search
None
See application file for complete search history.

(56) References Cited

U.S. PATENT DOCUMENTS

| | | | |
|---|---|---|---|
| 9,914,364 B2 * | 3/2018 | Shumaker | G06F 21/34 |
| 10,124,750 B2 * | 11/2018 | Markham | H04L 12/40 |

(Continued)

FOREIGN PATENT DOCUMENTS

| | | |
|---|---|---|
| CN | 201210314 Y | 3/2009 |
| CN | 104134287 A | 11/2014 |

(Continued)

OTHER PUBLICATIONS

Wee, Sherilyn T.M., "It's electric: Factors affecting PV and EV adoption" ProQuest Dissertations & Theses. (2016) (Year: 2016).*

(Continued)

*Primary Examiner* — Clay C Lee
(74) *Attorney, Agent, or Firm* — ANOVA LAW GROUP, PLLC (57) ABSTRACT

The present disclosure provides a fee calculation apparatus. The fee calculation apparatus includes: a first receiving unit configured to receive a unique identification of a vehicle; a transmission unit configured to send a first request to a vehicle payment system after completing a fee calculation, the first request including the unique identification of the vehicle; and a second receiving unit configured to receive a response to the first request from the vehicle payment system. The disclosure also provides a fee calculation method, a charging post including the fee calculation apparatus, a vehicle communicating with the fee calculation (Continued)

apparatus or the charging post, a vehicle payment system, a signaling transmission method and a computer storage medium for the vehicle payment system.

15 Claims, 4 Drawing Sheets

(51) Int. Cl.
*G06Q 20/14* (2012.01)
*G06Q 20/32* (2012.01)
*G06Q 20/36* (2012.01)

(56) References Cited

U.S. PATENT DOCUMENTS

| | | | | |
|---|---|---|---|---|
| 2009/0313103 A1* | 12/2009 | Ambrosio | ............... | B60L 53/64 705/14.34 |
| 2009/0313174 A1* | 12/2009 | Hafner | .................... | B60L 53/65 705/80 |
| 2013/0254097 A1 | 9/2013 | Marathe et al. | | |
| 2014/0067680 A1 | 3/2014 | Turner | | |
| 2014/0191030 A1 | 7/2014 | Reineccius et al. | | |
| 2014/0203077 A1* | 7/2014 | Gadh | ..................... | B60L 53/63 235/382 |
| 2014/0266004 A1* | 9/2014 | Andrews, Jr. | ........... | B60L 58/12 320/108 |
| 2015/0054460 A1* | 2/2015 | Epstein | ................... | B60L 53/64 320/109 |
| 2015/0356557 A1 | 12/2015 | McKinney | | |
| 2016/0012657 A1* | 1/2016 | Reineccius | ............ | G06Q 50/30 340/5.2 |
| 2017/0136894 A1* | 5/2017 | Ricci | ...................... | B60L 53/65 |
| 2019/0031036 A1* | 1/2019 | Haddad | ................... | B60L 53/18 |
| 2020/0006969 A1* | 1/2020 | Penilla | .................... | H04L 67/04 |

FOREIGN PATENT DOCUMENTS

| | | | | |
|---|---|---|---|---|
| CN | 105128690 A | 12/2015 | | |
| CN | 105172609 A | 12/2015 | | |
| CN | 204947664 U | 1/2016 | | |
| CN | 106347164 A | 1/2017 | | |
| CN | 106503979 A | 3/2017 | | |
| CN | 106882069 A | 6/2017 | | |
| CN | 106897874 A | 6/2017 | | |
| CN | 108320388 A | 7/2018 | | |
| DE | 10304284 A1 | 8/2004 | | |
| DE | 102013013142 A1 | 2/2014 | | |
| EP | 2371612 A1 * | 10/2011 | .......... | B60L 11/1824 |
| EP | 2455924 A1 | 5/2012 | | |
| EP | 2481627 A2 | 8/2012 | | |
| JP | 2011187044 A | 9/2011 | | |
| JP | 2012513739 A | 6/2012 | | |
| JP | 2015518614 A | 7/2015 | | |
| WO | 0103983 A1 | 1/2001 | | |
| WO | WO-2007019735 A1 * | 2/2007 | ............ | H04W 12/06 |
| WO | WO-2010051477 A2 * | 5/2010 | ................ | B60L 3/12 |
| WO | 2012058421 A2 | 5/2012 | | |
| WO | WO-2012171760 A1 * | 12/2012 | .......... | B60L 11/1838 |
| WO | WO-2014168376 A1 * | 10/2014 | .......... | B60L 11/1846 |
| WO | 2017029424 A1 | 2/2017 | | |
| WO | 2017067470 A1 | 4/2017 | | |
| WO | 2017192005 A1 | 11/2017 | | |

OTHER PUBLICATIONS

The World Intellectual Property Organization (WIPO) International Search Report for PCT/CN2018/120279 Feb. 28, 2019 pages.
The European Patent Office (EPO) Office Action 3 for 18897667.4, Mar. 1, 2024 8 Pages.

* cited by examiner

PROCESSING METHOD AND APPARATUS FOR FEE CALCULATION, AND VEHICLE PAYMENT SYSTEM

CROSS-REFERENCE TO RELATED APPLICATION

This application is a national phase entry under 35 U.S.C. § 371 of International Application No. PCT/CN2018/120279, filed on Dec. 11, 2018, which claims the priority of Chinese Patent Application No. 201711480886.4, entitled "Processing Method and Apparatus for Fee Calculation, and Vehicle Payment System", filed on Dec. 29, 2017, by the China UnionPay Co., Ltd., content of all of which is incorporated herein by reference in its entirety.

TECHNICAL FIELD

The present disclosure relates to the field of automobile technology and, in particular, to a fee calculation method and apparatus, a charging post including the fee calculation apparatus, a vehicle communicating with the fee calculation apparatus or the charging post, a vehicle payment system, a signaling transmission method and a computer storage medium for the vehicle payment system.

BACKGROUND TECHNOLOGY

With the improvement of people's living standards, vehicles have become a part of most people's lives. As a new energy vehicle, electric vehicles have the advantage of being non-polluting, and they are more and more popular and valued. Electric vehicles under development include pure battery-powered electric vehicles, hybrid electric vehicles that use electric motors and engines together, and fuel cell electric vehicles. The hybrid vehicles and pure electric vehicles that can be plugged with a power cord are electric vehicles which receive power required for driving from a high-voltage storage battery disposed inside the vehicle. This type of electric vehicle with a storage battery inside needs a power supply means capable of supplying electrical energy from the outside. As such, a large number of charging stations are constantly being established. Existing charging stations are composed of several charging posts, which is similar to existing gas stations, and each charging post or several charging posts are managed by designated staff to help vehicle owners with battery charging and fee charging. As a result, large charging stations require a large number of staff to manage and charge fees, thereby increasing costs and expenses for charging stations.

Currently, interactive intelligent payment methods (e.g., charging cards, code scanning, etc.) in which users participate have been proposed, can reduce the number of staff to a certain extent and reduce costs. Specifically, in a credit card payment scenario, the user first inserts the charging gun into the vehicle's charging port for charging. Then, fee calculation is performed by the charging post. Then, the user arrives at the charging posts to prepare to end the charging, selects to end the charging on the charging interface, insert card according to instructions, enter card transaction password (optional). Finally, the charging post communicates with the payment background to complete the payment, and the charging station shows that the payment has been completed, then the user pulls out the charging gun. In a Quick Response (QR) code payment scenario, the user first inserts the charging gun into the vehicle's charging port for charging, and the charging post performs the fee calculation. Then, the user reaches the position of the charging post to prepare to end the charging, and selects to end the charging on the charging interface. Then, the user scans an App using a mobile phone, and the mobile phone cooperates with a scanning device of the charging post to complete the scanning. Then, the charging post communicates with the payment background to complete the payment, and the charging station shows that the payment has been completed. Finally, the payment background notifies the mobile phone that the payment made by scanning the App using the mobile phone has been completed, and the user pulls out the charging gun and put away the charging.

In the above-mentioned scenario of card payment or QR code payment, users need to participate in payment transaction interactions, and the user cannot experience "no awareness", so that automatic payment from the user cannot be realized.

The above information disclosed in the background section of the disclosure is only intended to increase the understanding of the general background of the disclosure, and should not be taken as a concession or any form of suggestion that such information constitutes prior art that is already known to those of ordinary skill in the art.

SUMMARY OF THE INVENTION

In order to solve at least one of the multiple problems in the prior art, the present disclosure provides a fee calculation apparatus. The fee calculation apparatus includes: a first receiving unit configured to receive a unique identification of a vehicle; a transmission unit configured to send a first request to a vehicle payment system after completing a fee calculation, the first request including the unique identification of the vehicle; and a second receiving unit configured to receive a response to the first request from the vehicle payment system.

In the foregoing-described fee calculation apparatus, the first receiving unit is configured to receive the unique identification of the vehicle from a reading device in a charging gun. The reading device is configured to read the unique identification of the vehicle through a tag disposed in or around a charging port of the vehicle after the charging gun is inserted into the charging port of the vehicle.

In the foregoing-described fee calculation apparatus, the tag is an NFC tag, an RFID tag, or a QR code tag.

In the foregoing-described fee calculation apparatus, the first receiving unit is configured to receive the unique identification of the vehicle from a reading device in a charging gun. The reading device reads the unique identification of the vehicle via a power data transmission line, through a system bus that is connected to the vehicle via a charging port.

In the foregoing-described fee calculation apparatus, the first request is a payment deduction request sent from the transmission unit to the vehicle payment system. The payment deduction request includes the unique identification of the vehicle, a transaction amount, merchant information, and a transaction description.

In the foregoing-described fee calculation apparatus, the response to the first request includes a transaction success, a transaction failure, or a transaction nonresponse.

According to another aspect of the present disclosure, there is provided a charging post which includes a fee calculation apparatus as described above.

According to further aspect of the present disclosure, a vehicle payment system is provided. The vehicle payment system includes: a front device configured to receive a first request including a unique identification of a vehicle from a fee calculation apparatus and relay the first request to a token requesting device; and a token requesting device configured to obtain a transaction token according to the unique identification of the vehicle and return the transaction token to the front device.

In the foregoing-described vehicle payment system, the front device is configured to: initiate a transaction request to a transaction platform after obtaining the transaction token, receive a response to the transaction request from the transaction platform, and relay the response to fee calculation apparatus.

In the foregoing-described vehicle payment system, the token requesting device is configured to receive a transaction token corresponding to the unique identification of the vehicle from a background server of a vehicle manufacturer.

In the foregoing-described vehicle payment system, the token requesting device is configured to receive a transaction token corresponding to the unique identification of the vehicle from a user device.

In the foregoing-described vehicle payment system, the token requesting device is configured to store transaction tokens, and obtain a transaction token corresponding to the unique identification of the vehicle based on the unique identification of the vehicle.

In the foregoing-described vehicle payment system, the first request is a payment deduction request. And the deduction request includes the unique identification of the vehicle, a transaction amount, merchant information, and a transaction description.

According to still another aspect of the present disclosure, a fee calculation method is provided. The method includes: receiving a unique identification of a vehicle; sending a first request to a vehicle payment system after completing a fee calculation, the first request including the unique identification of the vehicle; and receiving a response to the first request from the vehicle payment system.

In the foregoing-described fee calculation method, receiving the unique identification of the vehicle includes receiving the unique identification of the vehicle from a reading device in a charging gun. The reading device is configured to automatically read the unique identification of the vehicle through a tag disposed in or around a charging port of the vehicle after the charging gun is inserted into the charging port of the vehicle.

In the foregoing-described fee calculation method, the tag is an NFC tag, an RFID tag, or a QR code tag.

In the foregoing-described fee calculation method, receiving the unique identification of the vehicle includes: receiving the unique identification of the vehicle from a reading device in the charging gun. The reading device reads the unique identification of the vehicle via a power data transmission line, through a system bus being connected to the vehicle via a charging port.

In the foregoing-described fee calculation method, sending the first request to the vehicle payment system includes sending a payment deduction request to the vehicle payment system. The payment deduction request includes the unique identification of the vehicle, a transaction amount, merchant information, and a transaction description.

In the foregoing-described fee calculation method, the response to the first request includes a transaction success, a transaction failure, or a transaction nonresponse.

According to another aspect of the present disclosure, a signaling transmission method for a vehicle payment system is provided. The vehicle payment system includes a front device and a token request device. And the signaling transmission method includes: the front device is configured to receive a first request including a unique identification of a vehicle from a fee calculation apparatus and relay the first request to a token requesting device; and the token requesting device obtains a transaction token according to the unique identification of the vehicle and returns the transaction token to the front device.

The foregoing-described signaling transmission method may further include: the front device initiates a transaction request to a transaction platform after obtaining the transaction token, receives a response to the transaction request from the transaction platform, and relays the response to the fee calculation apparatus.

In the foregoing-described signaling transmission method, the token requesting device obtains a transaction token according to the unique identification of the vehicle includes: the token requesting device is configured to receive a transaction token corresponding to the unique identification of the vehicle from a background server of a vehicle manufacturer.

In the foregoing-described signaling transmission method, the token requesting device obtains a transaction token according to the unique identification of the vehicle includes: the token requesting device receives a transaction token corresponding to the unique identification of the vehicle from a user device.

In the foregoing-described signaling transmission method, the token requesting device obtains a transaction token according to the unique identification of the vehicle includes: the token requesting device stores transaction tokens, and obtains a transaction token corresponding to the unique identification of the vehicle based on the unique identification of the vehicle.

In the foregoing-described signaling transmission method, the first request is a payment deduction request. The payment deduction request includes the unique identification of the vehicle, a transaction amount, merchant information, and a transaction description.

According to further aspect of the present disclosure, a computer storage medium is provided, which includes instructions that, when executed, perform the fee calculation method or signaling transmission method as described above.

According to further aspect of the present disclosure, there is provided a vehicle including a tag configured to communicate with the fee calculation apparatus or the charging post as described above.

In one embodiment, by embedding an electronic tag (e.g., NFC and/or RFID electronic tag) in or around the charging port of the vehicle, the tag stores the vehicle identification information in advance, and a reader (e.g., an NFC card reader) is added to a front of the charging gun, so that when the charging gun is inserted into the charging port of the vehicle, the information of the NFC tag on the vehicle can be read. As such, when charging, the user inserts the charging gun into the charging port and the vehicle identification information is automatically read through electronic tag technology. After charging is completed and the charging gun is pulled out, based on the fee calculated by the electricity fee calculation system, a payment deduction is initiated with reference to the vehicle identification information, to complete payment of fees. The entire payment process does not require any user operation, which provides a better user experience.

Other features and advantages of the method and apparatus of the present disclosure will become more specifically clear or clarified by the accompanying drawings incorporated herein and the specific embodiments used to explain certain principles of the present disclosure together with the drawings.

DETAILED DESCRIPTION OF THE EMBODIMENTS

The following description describes specific embodiments of the disclosure to teach those skilled in the art how to make and use the best mode of the disclosure. To teach the principles of the disclosure, some conventional aspects have been simplified or omitted. Those skilled in the art should understand that variations from these embodiments will fall within the scope of the disclosure. Those skilled in the art will appreciate that the features described below can be combined in various ways to form multiple variations of the disclosure. Accordingly, the disclosure is not limited to the specific embodiments described below, but only by the claims and their equivalents.

In the context of the present disclosure, the term "NFC", or "Near Field Communications", stands for short-range wireless communication technology and is a non-contact sensing and identification technology.

The term "VIN" stands for "Vehicle Identification Number", which means a vehicle's identification number. Because the SAE (American Society of Automotive Engineers) standard stipulates that the VIN code consists of 17 characters, it is also commonly known as the seventeen-digit code. It contains information such as vehicle manufacturer, year, model, body type and code, engine code and assembly location.

The term "TR" stands for "Token Request", which means the token requester. In the context of the present disclosure, a token requester refers to a party marked by a bank card, who requests a processing of a system.

The term "TSP" stands for "Token Service Provider", which means a token service provider. In the context of the present disclosure, a token service provider refers to a system serving party that provides markings of bank cards.

Figure 1:
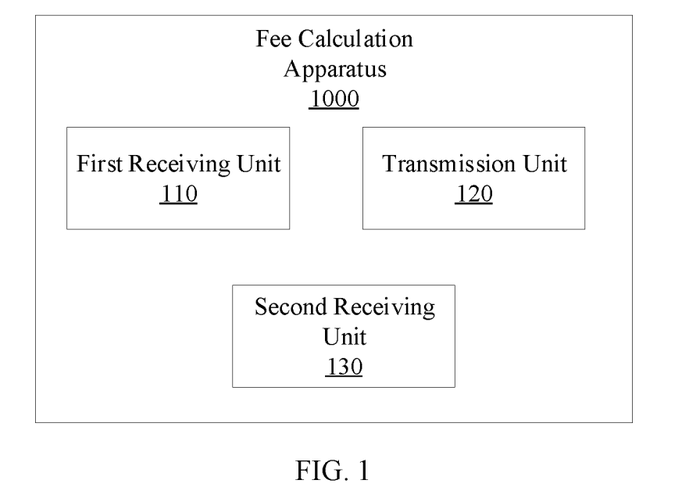
FIG. 1 is a schematic structural diagram illustrating a fee calculation apparatus according to one embodiment of the present disclosure.

FIG. 1 is a schematic structural diagram illustrating a fee calculation apparatus 100 according to one embodiment of the present disclosure. As shown in FIG. 1, the fee calculation apparatus 1000 includes a first receiving unit 110, a transmission unit 120, and a second receiving unit 130. The first receiving unit 110 is configured to receive a unique identification of a vehicle. The transmission unit 120 is configured to send a first request to a vehicle payment system after the fee calculation is completed. The first request includes the unique identification of the vehicle. The second receiving unit 130 is configured to receive a response to the first request from the vehicle payment system.

In one embodiment, the first receiving unit 110 is configured to receive the unique identification of the vehicle from a reading device in the charging gun. The reading device is configured to automatically (that is, without any manual intervention) read the unique identification of the vehicle through a tag disposed in or around the charging port of the vehicle after the charging gun is inserted into the charging port of the vehicle. In various embodiments of the present disclosure, the tag is an NFC tag, a RFID tag, a QR code tag, or other tag that may be configured to provide a unique identification of the vehicle.

In another embodiment, the first receiving unit 110 is configured to receive the unique identification of the vehicle from a reading device in the charging gun. The reading device reads the unique identification of the vehicle via a power data transmission line, through a system bus that is connected to the vehicle via a charging port. The system bus may be, for example, a CAN bus, that is, a controller area network bus. Of course, those skilled in the art can easily understand that other system buses in addition to the CAN bus may be used, including but not limited to a LIN bus.

In the above-mentioned fee calculation apparatus 1000, the first request is a payment deduction request sent by the transmission unit 120 to the vehicle payment system, and the payment deduction request includes the unique identification of the vehicle, a transaction amount, merchant information, and a transaction description. In one embodiment, the response to the first request includes a transaction success, a transaction failure, or a transaction nonresponse.

Figure 2:
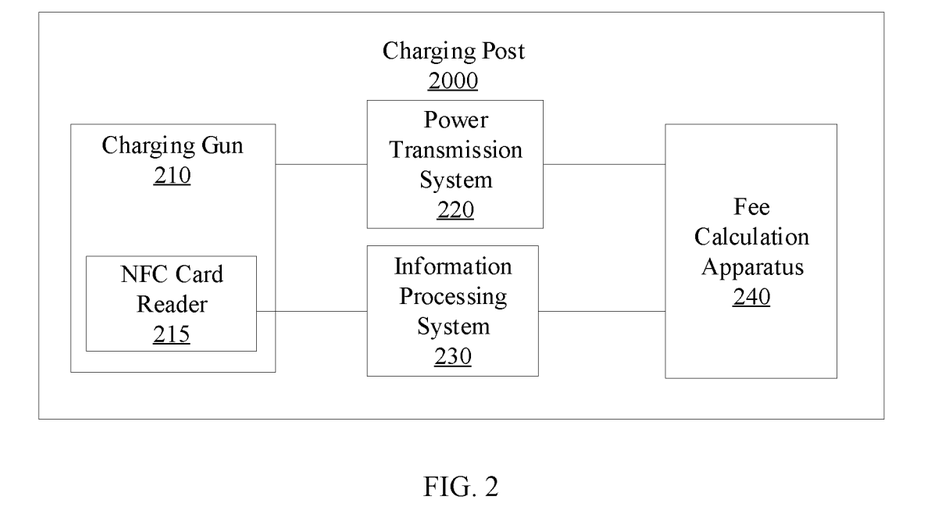
FIG. 2 is a schematic structural diagram illustrating a charging post according to one embodiment of the present disclosure.

FIG. 2 is a schematic structural diagram illustrating a charging post 2000 according to one embodiment of the present disclosure. As shown in FIG. 2, the charging post 2000 includes a fee calculation apparatus 240. In one embodiment, the fee calculation apparatus 240 may be configured to: receive the unique identification of the vehicle; after completing the fee calculation, sending a first request to the vehicle payment system, the first request including the unique identification of the vehicle such that the vehicle payment system initiates a transaction request to a transaction platform after obtaining a transaction token corresponding to the unique identification of the vehicle; and receives a response to the transaction request from the vehicle payment system.

As shown in FIG. 2, the charging post 2000 further includes a charging gun 210. An NFC card reader 215 is integrated in the charging gun 210. In one embodiment, the NFC card reader 215 is configured to automatically read the unique identification of the vehicle through an NFC tag disposed in or around the charging port of the vehicle after the charging gun 210 is inserted into the charging port of the vehicle. In addition, the charging gun 210 and the NFC card reader 215 communicate with the fee calculation apparatus 240 via a power transmission system 220 and an information processing system 230, respectively.

Figure 3:
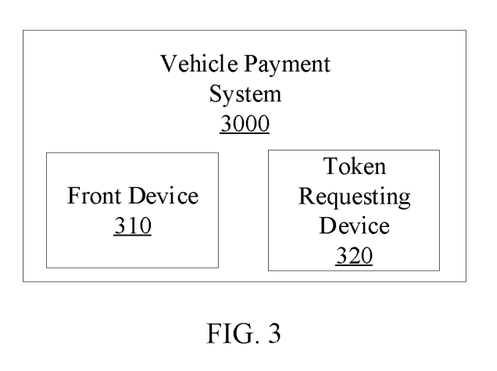
FIG. 3 is a schematic structural diagram illustrating a vehicle payment system according to one embodiment of the present disclosure.

FIG. 3 is a schematic structural diagram illustrating a vehicle payment system 3000 according to one embodiment of the present disclosure. As shown in FIG. 3, the vehicle payment system 3000 includes a front device 310 and a token requesting device 320. The front device 310 is configured to receive the first request including the unique identification of the vehicle from the fee calculation apparatus and relay the first request to the token requesting device. The token requesting device 320 is configured to obtain a transaction token according to the unique identification of the vehicle and return the transaction token to the front device 310.

The token requesting device 320 may obtain the transaction token according to the unique identification of the vehicle in various manners. In one embodiment, the token requesting device is configured to receive the transaction token corresponding to the unique identification of the vehicle from a background server of a vehicle manufacturer. In this embodiment, the token requesting device 320 is configured to relay the first request to the background server of the vehicle manufacturer corresponding to the unique identification of the vehicle for authentication and receive the transaction token from the background server of the vehicle manufacturer after successful authentication. In one embodiment, the background server of the vehicle manufacturer makes a pre-judgment of transaction behavior risk based on vehicle operation data (e.g., location information such as GPS); that is, performs risk authentication. In one embodiment, the background server of the vehicle manufacturer may push a confirmation button to an intelligent terminal of the vehicle via a network of vehicles for a vehicle owner to click to confirm.

In another embodiment, the token requesting device 320 is configured to receive the transaction token corresponding to the unique identification of the vehicle from a user device. For example, the user device has multiple transaction tokens stored in its security unit SE. The token requesting device 320 is configured to relay the unique identification of the vehicle to the user device, thereby obtaining the transaction token corresponding to the unique identification of the vehicle. In yet another embodiment, the token requesting device 320 is configured to store transaction tokens and obtain the transaction token corresponding to the unique identification of the vehicle based on the unique identification of the vehicle.

In the above vehicle payment system 3000, the front device 310 is configured to: initiate a transaction request to the transaction platform after obtaining the transaction token, receive a response to the transaction request from the transaction platform, and relay the response to the fee calculation apparatus. In one embodiment, the front device 310 is further configured to relay the response to the background server of the vehicle manufacturer.

In the vehicle payment system 3000 described above, the first request is the payment deduction request, and the payment deduction request includes the unique identification of the vehicle, the transaction amount, the merchant information, and the transaction description.

In one embodiment, the token requesting device 320 is further configured to receive a second request including the unique identification of the car from the background server of the vehicle manufacturer and relay the second request to the token service provider, so that the token service provider receives the transaction token corresponding to the unique identification of the vehicle. In one embodiment, the token requesting device 320 is further configured to send the transaction token to the background server of the vehicle manufacturer for storage.

Figure 4:
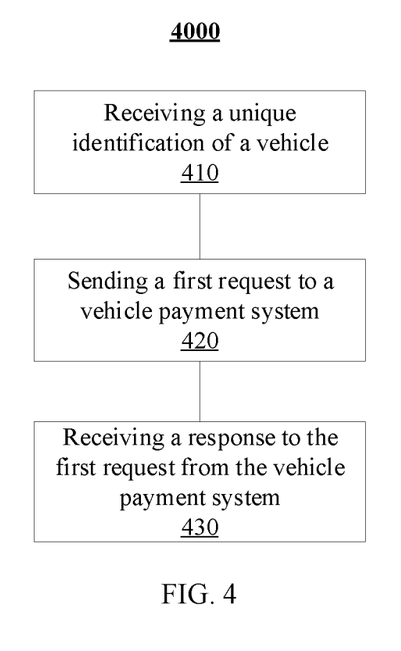
FIG. 4 is a flowchart illustrating a fee calculation method according to one embodiment of the present disclosure.

FIG. 4 is a flowchart illustrating a fee calculation method 4000 according to one embodiment of the present disclosure. The fee calculation method 4000 includes the following steps:

Step 410: Receiving a unique identification of a vehicle.

Step 420: After completing fee calculation, sending a first request to a vehicle payment system, the first request including the unique identification of the vehicle.

Step 430: Receiving a response to the first request from the vehicle payment system.

In one embodiment, step 410 may include receiving the unique identification of the vehicle from a reading device in a charging gun. The reading device is configured to read the unique identification of the vehicle by disposing an NFC tag in or around a charging port of the vehicle after the charging gun is inserted into the charging port of the vehicle. In one embodiment, the tag is an NFC tag, an RFID tag, or a QR code tag.

In another embodiment, step 410 may include receiving the unique identification of the vehicle from the reading device in the charging gun. The reading device reads the unique identification of the vehicle via a power data transmission line, through a system bus of the vehicle that is connected to the vehicle via a charging port. The system bus may be, for example, a CAN bus. Of course, those skilled in the art can easily understand that other system buses in addition to the CAN bus may be used, including but not limited to a LIN bus.

In one embodiment, step 420 includes sending a payment deduction request to the vehicle payment system. The payment deduction request includes the unique identification of the vehicle, a transaction amount, merchant information, and a transaction description. In one embodiment, the response to the first request includes a transaction success, a transaction failure, or a transaction non-response.

Figure 5:
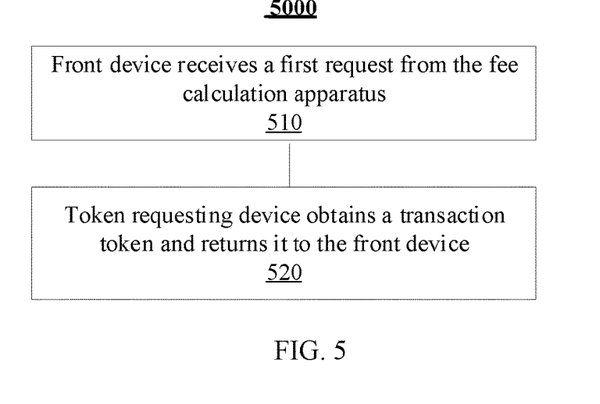
FIG. 5 is a flowchart illustrating a signaling transmission method for a vehicle payment system according to one embodiment of the present disclosure.

FIG. 5 is a flowchart illustrating a signaling transmission method 5000 for a vehicle payment system according to one embodiment of the present disclosure. The vehicle payment system includes a front device and a token requesting device. As shown in FIG. 5, the signaling transmission method 5000 includes the following steps.

In step 510, the front device is configured to receive a first request including a unique identification of a vehicle from a fee calculation apparatus and relay the first request to the token requesting device.

In step 520, the token requesting device obtains a transaction token according to the unique identification of the vehicle and returns the transaction token to the front device.

Although not shown, the above-mentioned signaling transmission method 5000 may further include: the front device initiates a transaction request to a transaction platform after obtaining the transaction token, receives a response to the transaction request from the transaction platform, and replays the response to the fee calculation apparatus.

In one embodiment, step 510 include: the token requesting device is configured to receive the transaction token corresponding to the unique identification of the vehicle from a background server of the vehicle manufacturer. In another embodiment, step 510 includes: the token requesting device receives the transaction token corresponding to the unique identification of the vehicle from a user device. In another embodiment, step 510 includes: the token requesting device stores transaction tokens, and obtains the transaction token corresponding to the unique identification of the vehicle based on the unique identification of the vehicle.

In one embodiment, the method 5000 may further include: the front device relays the response to the background server of the vehicle manufacturer.

In one embodiment, the first request is a payment deduction request. The payment deduction request includes the unique identification of the vehicle, a transaction amount, merchant information, and a transaction description.

In one embodiment, the method 5000 may further include: the token requesting device receives a second request including the unique identification of the vehicle from a background server of the vehicle manufacturer, and relays the second request to a token service provider in order to receive the transaction token corresponding to the unique identification of the vehicle from the token service provider. In one embodiment, the method 5000 may further include: the token requesting device sends the transaction token to the background server of the vehicle manufacturer for storage.

Those skilled in the art can understand that the foregoing fee calculation method or signaling transmission method may be provided as a computer program product. Therefore, the present disclosure may take the form of a computer program product implemented on one or more computer-usable storage media (including but not limited to disk storage and optical storage, etc.) containing computer-usable program code.

In one embodiment, the vehicle includes a tag around its charging port, being configured to communicate with the fee calculation apparatus or the charging post. And the tag is an NFC tag, an RFID tag, or a QR code tag.

Although the embodiments of the present disclosure are mostly described based on the NFC tag, the RFID tag, or the QR code tag, those skilled in the art may consider using other electronic tag technologies for implementation.

Figure 6:
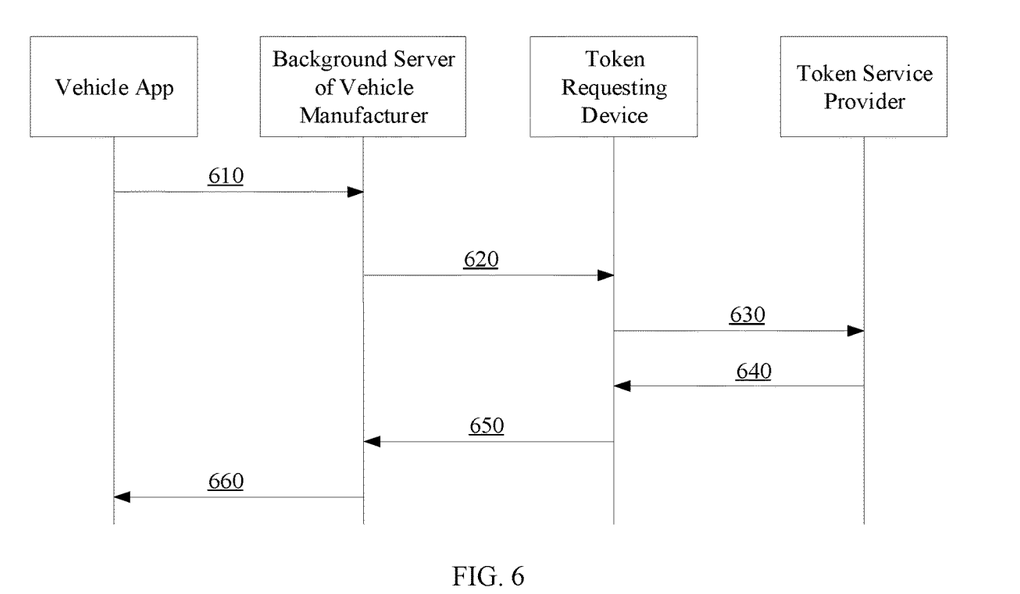
FIG. 6 is a flowchart illustrating a pre-opening of an automobile account according to one embodiment of the present disclosure.

FIG. 6 is a flowchart illustrating a pre-opening of an automobile account according to one embodiment of the present disclosure. In one embodiment, a binding of the vehicle identification information (e.g., the vehicle identification number (VIN)) and a default payment account of a bank card are completed through an App information interaction. In step 610, the user fills in card information and vehicle information through a vehicle App or a vehicle manufacturer mobile App. For example, credit card information needs to include a card number, CVN2, a validity period, a mobile phone number, and a short message service verification code. The vehicle information includes at least the vehicle identification number (e.g., the vehicle owner obtained the VIN information when purchasing the vehicle), and is further provided with car brand, car model, car color, date of manufacture, license plate number, etc. Then the information is submitted to the background server of the vehicle manufacturer (e.g., the vehicle manufacturer mobile App) through the vehicle App or vehicle manufacturer mobile App. In step 620, the vehicle manufacturer mobile App adds a manufacturer identification number allocated by the bank card, and replays the request message to a TR (e.g., a token requesting device) of the network of vehicles. In step 630, the token requesting device applies for paying the token (that is, payment token) to the token service provider (TSP) with the information of the step 620, and generates a transaction serial number. In step 640, the TSP returns the transaction token to the TR. In step 650, the TR returns the token, last 4 digits of the card number, and the transaction serial number to the background server of the vehicle manufacturer. In step 660, the background server of the vehicle manufacturer stores the token and initiates a transaction completion notification to the vehicle mobile App. Finally, the user can select a default card in the vehicle App among multiple bank cards that have been bound to the vehicle App.

Figure 7:
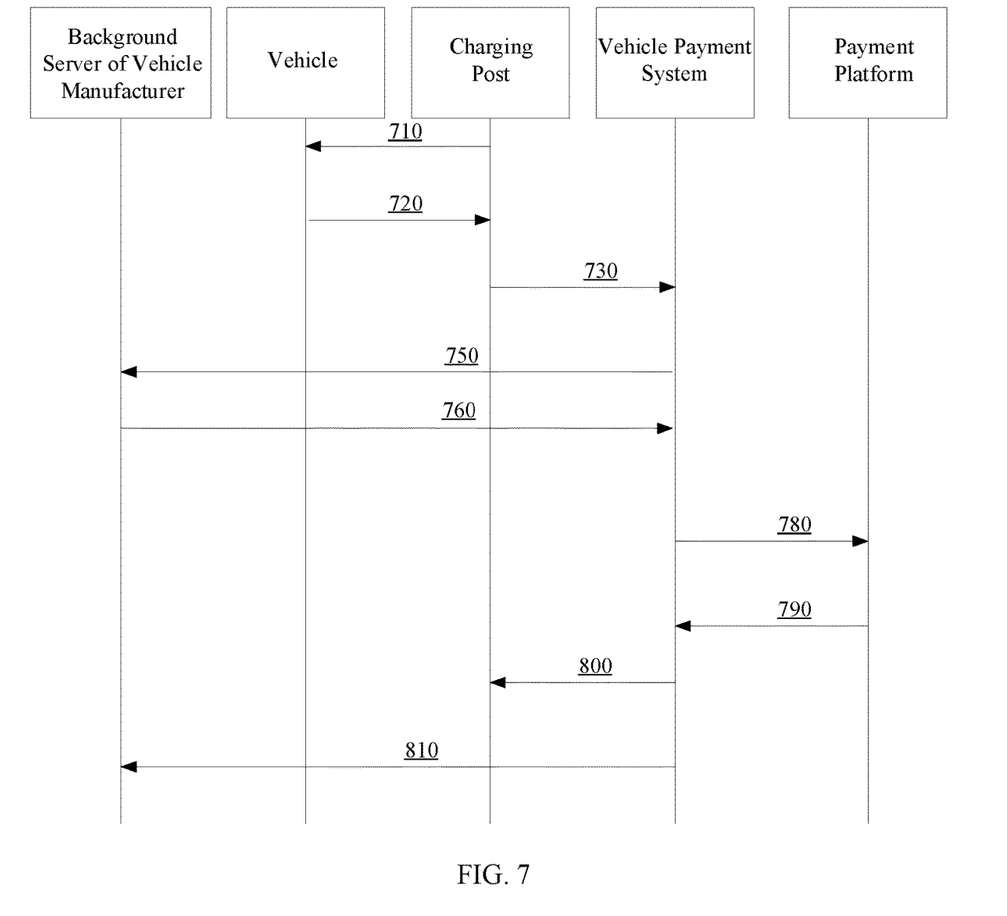
FIG. 7 is a flowchart illustrating a payment transaction according to one embodiment of the present disclosure.

FIG. 7 is a flowchart illustrating a payment transaction according to one embodiment of the present disclosure. First, the user inserts the charging gun into the charging port of the vehicle. As shown in FIG. 7, in step 710, a front-end card reader of the charging gun automatically reads the VIN information in the NFC tag around the charging port of the vehicle. In step 720, the VIN information is transmitted to the charging gun information processing system in the charging post. Then, the charging gun starts a charging. In step 730, after the charging is completed, the charging post automatically completes a current fee calculation, and sends a payment deduction request to the vehicle payment system with both the merchant information and the VIN. In step 750, the vehicle payment system inquires a database of a previously opened information and relays it to the background server of the corresponding vehicle manufacturer for processing, expecting to obtain a vehicle manufacture authentication. In step 760, the background server of the vehicle manufacture makes a pre-judgment of transaction behavior risk based on the vehicle operation data (e.g., location information such as GPS), and then returns the token corresponding to the VIN to the vehicle payment system. In step 780, the vehicle payment system initiates a payment deduction transaction to the transaction platform. In step 790, the transaction platform responds to the transaction to the vehicle payment system. In step 800, the vehicle payment system relays the response transaction to the charging station. In step 810, the vehicle payment system initiates a transaction notification to the vehicle App. So far, after the charging is completed, the automatic payment deduction and checkout is completed without the user's participation.

Accordingly, by embedding tags (such as NFC and/or RFID electronic tags) in or around the charging port of the vehicle, the vehicle identification information is stored in advance in the tag, and a reader (e.g., an NFC card reader) is added to a front of the charging gun, so that when the charging gun is inserted into the charging port of the vehicle, the tag information on the vehicle can be read. Accordingly, when charging, after the user inserts the charging gun into the charging port, the vehicle identification information is automatically read through electronic tag technology. After charging is completed and the charging gun is pulled out, a payment deduction is automatically initiated with reference to the vehicle identification information to complete payment of fees. The entire payment process does not require any user operation, which provides a better user experience.

The above examples mainly explain the fee calculation method and apparatus of the present disclosure, a charging post including the fee calculation apparatus, a vehicle communicating with the fee calculation apparatus or the charging post, a vehicle payment system, and a signaling transmission method and a computer storage medium for the vehicle payment system. Although only some of the one or more embodiments of the present disclosure have been described, those of ordinary skill in the art should understand that the present disclosure can be implemented in many other forms without departing from the spirit and scope thereof. Therefore, the illustrated examples and implementations are to be regarded as illustrative rather than limiting, and the present disclosure may cover various modifications and substitutions without departing from the spirit and scope of the disclosure as defined by the appended claims.

What is claimed is:

1. A fee calculation apparatus external to a vehicle, comprising:
   a first receiver configured to receive a unique identification of the vehicle from a reading device in a charging gun, wherein the reading device is configured to automatically read the unique identification of the vehicle through a tag disposed in or around a charging port of the vehicle after the charging gun is inserted into the charging port of the vehicle;
    a transmitter configured to send a first request to a background server of a vehicle manufacturer for authentication after completing a fee calculation, the first request including the unique identification of the vehicle, wherein the first request is a payment deduction request configured to request the background server to send a transaction token which is stored on the background server and corresponds to the unique identification of the vehicle, the transaction token is used to initiate a transaction request to a transaction platform, and the background server is remote from the vehicle and performs, in response to the payment deduction request, a transaction behavior risk judgement based on vehicle operation data of the vehicle and the transaction token corresponding to the unique identification of the vehicle, wherein the transaction behavior risk judgement includes risk authentication through vehicle owner confirmation by pushing a confirmation button to an intelligent terminal for a vehicle owner to click to confirm a payment of a transaction corresponding to the payment deduction request; and
    a second receiver configured to receive the transaction token from the background server according to a result of the transaction behavior risk judgement,
    wherein:
    the transmitter is further configured to initiate the transaction request to the transaction platform according to the payment deduction request in response to obtaining the transaction token; and
    the second receiver is further configured to receive a response to the transaction request from the transaction platform, the response being generated by the transaction platform and indicating an outcome of processing the transaction request.

2. The fee calculation apparatus according to claim 1, wherein the tag is an NFC tag, an RFID tag, or a QR code tag.

3. The fee calculation apparatus according to claim 1, wherein:
    the payment deduction request comprises: the unique identification of the vehicle, a transaction amount, merchant information, and a transaction description.

4. The fee calculation apparatus according to claim 1, wherein the response to the first request comprises: a transaction success, a transaction failure, or a transaction non-response.

5. A charging post, comprising the fee calculation apparatus according to claim 1.

6. A fee calculation method, comprising:
    receiving, by a token requesting device of a vehicle payment system, a unique identification of a vehicle from a reading device in a charging gun, wherein the reading device is configured to automatically read the unique identification of the vehicle through a tag disposed in or around a charging port of the vehicle after the charging gun is inserted into the charging port of the vehicle, or the reading device is configured to automatically read the unique identification of the vehicle via a power data transmission line after the charging gun is inserted into the charging port of the vehicle, the power data transmission line being connected to a system bus of the vehicle via the charging port of the vehicle;
    sending, by the token requesting device, a first request to a background server of a vehicle manufacturer for authentication after completing a fee calculation, the first request including the unique identification of the vehicle, wherein the first request is a payment deduction request configured to request the background server to send a transaction token which is stored on the background server and corresponds to the unique identification of the vehicle, and the background server is remote from the vehicle;
    performing, by the background server in response to the payment deduction request, a transaction behavior risk judgement based on vehicle operation data of the vehicle and the transaction token corresponding to the unique identification of the vehicle, wherein the transaction behavior risk judgement includes risk authentication through vehicle owner confirmation by pushing a confirmation button to an intelligent terminal for a vehicle owner to click to confirm a payment of a transaction corresponding to the payment deduction request;
    receiving the transaction token from the background server according to a result of the transaction behavior risk judgement;
    initiating a transaction request to a transaction platform after obtaining the transaction token; and
    receiving a response to the transaction request from the transaction platform, the response indicating an outcome of the transaction platform processing the transaction request.

7. The fee calculation method according to claim 6, wherein the tag is an NFC tag, an RFID tag, or a QR code tag.

8. The fee calculation method according to claim 6, wherein
    the payment deduction request comprises: the unique identification of the vehicle, a transaction amount, merchant information, and a transaction description.

9. The fee calculation method according to claim 6, wherein the response to the first request comprises: a transaction success, a transaction failure, or a transaction non-response.

10. The fee calculation method according to claim 6, further comprising:
    initiating, by the charging gun, charging the vehicle after the unique identification of the vehicle is received by the reading device.

11. The fee calculation method according to claim 6, wherein the first request further comprises merchant information corresponding to the fee calculation.

12. The fee calculation method according to claim 6, wherein the vehicle operation data includes location information of the vehicle.

13. The fee calculation method according to claim 6, further comprising:
    pushing, by the background server of the vehicle manufacturer when performing the transaction behavior risk judgement, a confirmation request to an intelligent terminal of the vehicle via a network for a vehicle owner to confirm.

14. The fee calculation method according to claim 13, wherein the network is a network of vehicles.

15. The fee calculation method according to claim 6, wherein the transaction token corresponds to a bank card.

\* \* \* \* \*